(12) United States Patent
Zahn

(10) Patent No.: US 10,873,062 B2
(45) Date of Patent: Dec. 22, 2020

(54) RECHARGEABLE BATTERY

(71) Applicant: Robert Bosch GmbH, Stuttgart (DE)

(72) Inventor: Wolf Zahn, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 14/485,338

(22) Filed: Sep. 12, 2014

(65) Prior Publication Data

US 2015/0079434 A1 Mar. 19, 2015

(30) Foreign Application Priority Data

Sep. 16, 2013 (DE) .................. 10 2013 218 532

(51) Int. Cl.
| | |
|---|---|
| *H01M 2/10* | (2006.01) |
| *H01M 10/6235* | (2014.01) |
| *H01M 10/613* | (2014.01) |
| *H01M 10/6554* | (2014.01) |
| *H01M 10/6551* | (2014.01) |
| *H01M 2/08* | (2006.01) |
| *H01M 10/653* | (2014.01) |
| *H01M 10/6563* | (2014.01) |
| *H01M 10/643* | (2014.01) |

(52) U.S. Cl.
CPC .......... *H01M 2/1016* (2013.01); *H01M 2/08* (2013.01); *H01M 2/1022* (2013.01); *H01M 10/613* (2015.04); *H01M 10/6235* (2015.04); *H01M 10/653* (2015.04); *H01M 10/6551* (2015.04); *H01M 10/6554* (2015.04); *H01M 10/6563* (2015.04); *H01M 10/643* (2015.04)

(58) Field of Classification Search
CPC .......... H01M 10/60–6235; H01M 10/65–6566
See application file for complete search history.

(56) References Cited

U.S. PATENT DOCUMENTS

| | | | |
|---|---|---|---|
| 5,686,815 A | 11/1997 | Reipur et al. | |
| 6,225,784 B1 | 5/2001 | Kinoshita et al. | |
| 6,636,016 B2* | 10/2003 | Tanaka ...................... | G06F 1/26 320/107 |
| 2003/0027037 A1* | 2/2003 | Moores, Jr. ............. | B25F 5/008 429/82 |
| 2003/0096160 A1* | 5/2003 | Sugiura ............... | H01M 2/1022 429/120 |
| 2006/0038532 A1 | 2/2006 | Taniguchi | |
| 2011/0101919 A1* | 5/2011 | Polk .................. | H01M 10/0525 320/118 |

(Continued)

FOREIGN PATENT DOCUMENTS

| | | |
|---|---|---|
| DE | 10153916 | 5/2003 |
| DE | 102005050563 | 4/2007 |

(Continued)

*Primary Examiner* — Jonathan Crepeau
*Assistant Examiner* — Jacob Buchanan
(74) *Attorney, Agent, or Firm* — Norton Rose Fulbright US LLP; Gerard Messina

(57) ABSTRACT

A rechargeable battery, in particular a rechargeable battery for a power tool, which includes a cell block having a sealing device provided for closing the cell block in at least a dust-proof and/or water-proof manner, and which includes an external rechargeable battery housing. It is provided that the external rechargeable battery housing is provided for conducting an airflow along between the external rechargeable battery housing and the sealing device.

13 Claims, 4 Drawing Sheets

(56) References Cited

U.S. PATENT DOCUMENTS

| | | | |
|---|---|---|---|
| 2011/0156657 A1 | 6/2011 | Anderson | |
| 2012/0045667 A1* | 2/2012 | Yoneda | H01M 2/1055 |
| | | | 429/7 |
| 2012/0045671 A1* | 2/2012 | Miller | H01M 10/613 |
| | | | 429/82 |
| 2012/0215517 A1 | 8/2012 | Bohlen et al. | |
| 2013/0295423 A1* | 11/2013 | Engel | H01M 2/1252 |
| | | | 429/83 |

FOREIGN PATENT DOCUMENTS

| | | | |
|---|---|---|---|
| DE | 102010024802 | 12/2011 | |
| DE | 10 2010 040 740 A1 * | 3/2012 | H01M 10/613 |
| EP | 940864 | 9/1999 | |
| EP | 994523 | 4/2000 | |
| EP | 1100173 | 5/2001 | |
| EP | 1309019 | 5/2003 | |
| EP | 2023461 | 2/2009 | |
| GB | 2457819 | 9/2009 | |

* cited by examiner

RECHARGEABLE BATTERY

RELATED APPLICATION INFORMATION

The present application claims priority to and the benefit of German patent application no. 10 2013 218 532.4, which was filed in Germany on Sep. 16, 2013, the disclosure of which is incorporated herein by reference.

FIELD OF THE INVENTION

The present invention relates to a rechargeable battery.

BACKGROUND INFORMATION

A rechargeable battery for a power tool, which includes a cell block with a sealing device provided for closing the cell block in at least a dust-proof and/or water-proof manner, and which includes an external rechargeable battery housing, has already been provided.

SUMMARY OF THE INVENTION

The present invention is directed to a rechargeable battery, in particular a rechargeable battery for a power tool, which includes a cell block having a sealing device provided for closing the cell block in at least a dust-proof and/or water-proof manner, and which includes an external rechargeable battery housing.

It is provided that the external rechargeable battery housing is provided for conducting an airflow along between the external rechargeable battery housing and the sealing device. A "rechargeable battery for a power tool" is intended, in particular, to mean a rechargeable battery which is provided for supplying a tool with electrical energy. In particular, a "tool" is intended to mean a tool which appears useful to those skilled in the art, advantageously, however, a power drill, a drill hammer, a percussion hammer, a saw, a plane, a screwdriver, a milling tool, a grinder, an angle grinder, a construction site measuring device, a multifunctional tool and/or advantageously a garden tool, in particular, a lawn mower. Alternatively or in addition, the rechargeable battery could be provided for supplying an at least partially electrically powered bicycle with energy. In particular, for supplying energy to a device, the rechargeable battery may be connected non-destructively and, in particular, without tools to and disconnected from the device by an operator. A "cell block" is intended, in particular, to mean a unit which includes multiple rechargeable battery cells, which are provided for delivering electrical energy, in particular, to a tool.

The cell block may include at least two rechargeable battery cells, advantageously at least eight rechargeable battery cells, particularly advantageously at least 16 rechargeable battery cells. Advantageously, the rechargeable battery cells are fixed in position relative to one another. Particularly advantageously, a heat dissipating arrangement of the cell block places the rechargeable battery cells relative to one another. In particular, the cell block has a cell block housing, which is provided for fastening the heat dissipating arrangement and, advantageously therefore, the rechargeable battery cells to one another. In particular, the cell block in at least one assembly step forms a module.

The cell block may be intended to provide electrical energy at a voltage of greater than 14 volts, particularly advantageously greater than 20 volts. In particular, the cell block is intended to provide electrical energy with a voltage of less than 50 volts. The cell block, and therefore the rechargeable battery, has, in particular, a storage capacity of less than 200 watt hours, advantageously less than 750 watt hours, particularly advantageously less than 250 watt hours. In particular, the cell block, and therefore the rechargeable battery, has a storage capacity of more than 2 watt hours, advantageously more than 25 watt hours, particularly advantageously more than 100 watt hours.

A "sealing device" is intended, in particular, to mean a device which appears useful to those skilled in the art, which is suited for preventing dust and/or moisture from penetrating into the cell block. In particular, the sealing device prevents dust and/or moisture from penetrating into, in particular, essentially the entire area between the rechargeable battery cells of the cell block. A "sealing device" is, in particular, not intended to mean a device which seals or isolates one individual rechargeable battery cell. "Provided" is intended, in particular, to mean specifically programmed, configured and/or equipped. That an object is provided for a particular function is intended, in particular, to mean that the object fulfills and/or carries out this particular function in at least one application state and/or operating state. The expression "protect against a penetration of dust and/or moisture" is intended, in particular, to mean that the sealing device prevents a penetration of water and/or dust into the cell block in at least one operating state.

The sealing device may protect the cell block in accordance with the IEC 60529 standard at least with the protection rating IP55, which may be IP67, particularly IP68. Electrical contacts of the rechargeable battery, in particular energy contacts and communication contacts of the rechargeable battery, may be situated in an area located outside of one of the areas protected by the sealing device. An "external rechargeable battery housing" is intended, in particular, to mean a housing, which is provided for protecting the cell block from external mechanical influences. The external rechargeable battery housing may form an exterior of the rechargeable battery. In particular, the external rechargeable battery housing includes an arrangement for mechanical coupling to a tool. The rechargeable battery housing may enclose the cell block at least essentially completely, i.e., in particular, the rechargeable battery housing encloses by greater than 270 degrees a center point of the cell block along two planes perpendicular to one another.

An "airflow" is intended, in particular, to mean a technically induced movement of air through a predefined space. A speed of the airflow may amount to at least 1 cm/s, which may be at least 2 cm/s, particularly 5 cm/s in at least one operating state at at least one point within the external rechargeable battery housing. The airflow has, in particular, a volume flow of at least 1 cm$^3$/s, advantageously at least 2 cm$^3$/s, particularly advantageously 5 cm$^3$/s. The term "between" in this context is intended, in particular, to mean that the airflow passes through an area, which lies on at least one straight line which, starting from the area, intersects the external rechargeable battery housing on one first side of the area and the cell block on one second, other side. "Conduct along" in this context is intended, in particular, to mean that the airflow passes at least partially through a 2 cm long, advantageously at least a 4 cm long, particularly advantageously at least an 8 cm long tunnel, which is delimited by the external rechargeable battery housing and the cell block.

With the embodiment of the rechargeable battery according to the present invention, it is possible to advantageously configure the cell block dust-proof and/or water-proof in a constructively simple manner, and to charge the rechargeable battery using a rechargeable battery charger which requires an airflow in an area in which the rechargeable battery is situated during a charging operation.

In another embodiment, it is provided that the external rechargeable battery housing delimits an airflow opening, which is provided to conduct the airflow, in particular, of the rechargeable battery charger into the external rechargeable battery housing, whereby a minimal air resistance may be achieved. An "airflow opening" is intended, in particular, to mean an opening, through which in at least one operating state the airflow enters the external rechargeable battery housing or exits the external rechargeable battery housing. The airflow opening may have an effective opening cross section of more than 1 cm$^2$, particularly of more than 2 cm$^2$. The airflow opening may be delimited by one individual housing part of the external rechargeable battery housing. Alternatively, the airflow opening could be delimited by multiple housing parts of the external rechargeable battery housing. "Conduct into" is intended, in particular, to mean that the airflow enters through the airflow opening into the external rechargeable battery housing in at least one operating state.

It is also provided that the external rechargeable battery housing is provided for conducting the airflow out through at least one housing gap of the external rechargeable battery housing, whereby an advantageous protection from mechanical influences may be achieved by openings, through which the airflow exits the housing. A "housing gap" is intended, in particular, to mean an opening delimited by the external rechargeable battery housing, which is situated between two housing parts of the external rechargeable battery housing. The housing gap may have a maximum dimension in at least one direction, i.e., a clearance, of smaller than 5 mm, advantageously smaller than 2 mm, particularly advantageously smaller than 1 mm. Alternatively, the external rechargeable battery housing could also delimit another airflow opening, which is provided for conducting the airflow, in particular of a rechargeable battery charger, out of the external rechargeable battery housing, in particular during a charging operation. "Conduct out" is intended, in particular, to mean that the airflow exits the external rechargeable battery housing through the other airflow opening in at least one operating state.

It is further provided that the sealing device includes a sealing film, which encloses the cell block in at least one plane, making possible a constructively simple water-proof and/or dust-proof configuration. A "sealing film" is intended, in particular, to mean a film which is provided for sealing an area spanned by the cell block in a dust-proof and/or water-proof manner. In particular, the sealing film is thinner than 1000 µm, which may be thinner than 500 µm, and/or particularly thinner than 200 µm. The sealing film is configured, in particular, as an embossed film. Advantageously, the sealing film is configured as a self-shrinking film caused, in particular, by the effect of heat. The sealing film may have a tubular configuration. Alternatively, the sealing film could have sack-like configuration. Alternatively or in addition to the sealing film, butt joints between different components of the cell block housing could be sealed by the sealing device in a water-proof and/or dust-proof manner. In this context, the term "encloses in at least one plane" is intended, in particular, to mean that the sealing film surrounds a center point of the cell block at least in the plane, by more than 180 degrees, advantageously by more than 270 degrees, particularly advantageously by 360 degrees.

In addition, it is provided that the rechargeable battery includes a rechargeable battery cooling device, which is provided for cooling the cell block essentially independently of the airflow, whereby a charging with a rechargeable battery charger is advantageously possible in which no airflow is generated through the rechargeable battery. A "rechargeable battery cooling device" is intended, in particular, to mean a device, which is provided to at least essentially dissipate heat created during a charging operation and/or a discharging operation of the cell block during the operation to the surroundings. The rechargeable battery cooling device may prevent the cell block from overheating during the charging operation and/or discharging operation. The expression "essentially independent of the airflow" is intended, in particular, to mean that at most 40%, advantageously at most 25% of heat energy dissipated during a charging operation and/or a discharging operation is dissipated by the airflow through the external rechargeable battery housing.

It is further provided that the rechargeable battery cooling device includes at least one heat dissipating arrangement situated in the cell block, which is provided for dissipating heat from the cell block, thereby enabling an advantageous cooling to be achieved. A "heat dissipating arrangement" is intended, in particular, to mean an arrangement which has a heat conductivity of greater than 5 W/(mK), advantageously greater than 25 w/(mK), particularly advantageously greater than 100 W/(m K). In particular, the heat dissipating arrangement is configured as a metal part, advantageously as an aluminum part, particularly advantageously as an aluminum profile. Alternatively, the heat dissipating arrangement could be formed from another material which appears useful to those skilled in the art, for example, carbon, and/or include a heat dissipation element which appears useful to those skilled in the art, for example, a heat pipe and/or a carbon nanotube. The heat dissipating arrangement may be provided for positioning the rechargeable battery cells.

In particular, the heat dissipating arrangement is provided for protecting the rechargeable battery cells from mechanical influences. Advantageously, the heat dissipating arrangement is provided for cooling rechargeable battery cells which are situated internally at least compared to other rechargeable battery cells. The heat dissipating arrangement may have an extent along a straight line which amounts to at least 25%, advantageously 50%, particularly advantageously at least 75% of an extent of the cell block on the straight line. "Heat" is intended, in particular, to mean a heat loss created in the rechargeable battery cells during a charging and discharging of the cell block. In this context, the term "dissipate" is intended, in particular, to mean that the heat dissipating arrangement cools the rechargeable battery cells in at least one operating state. In particular, the heat dissipating arrangement or, if necessary, the multiple heat dissipating arrangements of the cell block dissipate a significant portion of the total dissipated heat created in the rechargeable battery cells, i.e., in particular, in at least one operating state more than 30% of the total dissipated heat, advantageously more than 50% of the total dissipated heat, particularly advantageously more than 75% of the total dissipated heat.

In one advantageous embodiment of the present invention, it is provided that the rechargeable battery cooling device includes a heat radiating arrangement, which is provided for at least radiating the heat dissipated by the heat dissipating arrangement, whereby an advantageous cooling may be achieved independently of the airflow. A "heat radiating arrangement" is intended, in particular, to mean an arrangement, which is provided for emitting, specifically, at least radiating, the heat dissipated from the cell block to the surroundings. Advantageously, the heat radiating arrangement also emits a portion of the dissipated heat by conduction and, in particular, by convection to the surrounding air. The heat radiating arrangement may form at least one exterior surface of the rechargeable battery. In particular, the exterior surface of the heat radiating arrangement includes cooling fins, a black coloring and/or a coating, which is provided for optimizing heat radiation. The rechargeable battery housing includes multiple heat radiating arrangements, which may particularly be situated on different exteriors of the rechargeable battery.

Alternatively, the rechargeable battery housing could have precisely one heat radiating arrangement which, in particular, is situated on multiple sides and advantageously precisely on one side of the rechargeable battery. In addition, the rechargeable battery housing could have at least three, advantageously four or particularly advantageously at least five heat radiating arrangements, which particularly may be situated on different exteriors of the rechargeable battery. The heat dissipating arrangement and the heat radiating arrangement may be formed as separately configured components. This expression is intended, in particular, to mean that the heat dissipating arrangement and the heat radiating arrangement are configured in at least one assembly step as two different components. Advantageously, the heat dissipating arrangement and the heat radiating arrangement, once assembled, are connected to one another in an integrally joined, form-locked and/or force-locked manner. Particularly advantageously, the heat dissipating arrangement and the heat radiating arrangement, once assembled, are connected in a form-locked and force-locked manner.

Also provided is a system which includes a rechargeable battery charger and a rechargeable battery according to the present invention.

It is also provided that the rechargeable battery charger includes charger electronics and a charger cooling device, which is provided for using the airflow conducted through the rechargeable battery at least partially for cooling the charger electronics, whereby rechargeable batteries which use the airflow for cooling may be advantageously quickly charged. "Charger electronics" is intended, in particular, to mean electronics which are provided at least for converting a system voltage into a charging voltage. The charger electronics may be provided for controlling and advantageously regulating a charging operation. A "charger cooling device" is intended, in particular, to mean a charger cooling device which is provided for cooling at least the charger electronics. The charger cooling device blows the airflow through the charger electronics. Alternatively, the charger cooling device could blow the airflow past a cooling body thermally coupled to the charger electronics.

It is further provided that the cooling device includes a ventilator, which generates the airflow, whereby an advantageous airflow may be generated in a constructively simple manner. In this context, "generate" is intended to mean that a movement of the ventilator induces the airflow.

The rechargeable battery according to the present invention is not intended to be limited to the use and specific embodiment described above. In particular, the rechargeable battery according to the present invention may include a number which differs from a number of individual arrangements, components and units mentioned herein for meeting a functionality described herein.

Additional advantages result from the following description of the drawing. Represented in the drawing is one exemplary embodiment of the present invention. The drawing, the description and the claims contain numerous features in combination. Those skilled in the art will advantageously also consider the features individually and combine them to form other meaningful combinations.

DETAILED DESCRIPTION

Figure 1:
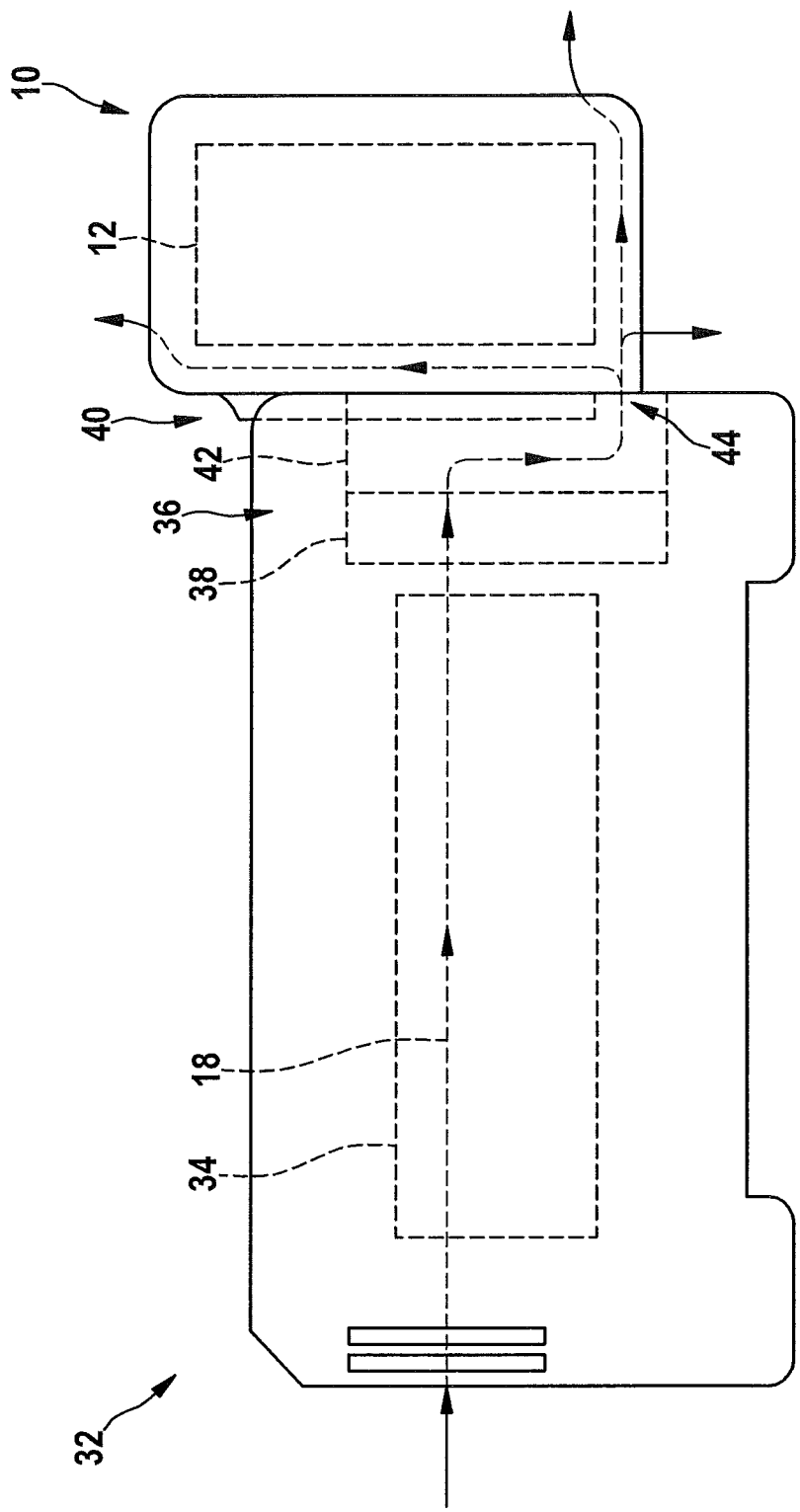
FIG. 1 shows a system which includes a rechargeable battery according to the present invention and a rechargeable battery charger which generates an airflow through an external rechargeable battery housing of the rechargeable battery.

FIG. 1 shows a system which includes a rechargeable battery 10 and a rechargeable battery charger 32. Rechargeable battery charger 32 is provided for charging rechargeable battery 10 and for cooling it during a charging operation. Rechargeable battery charger 32 includes charger electronics 34, a charger cooling device 36 and a rechargeable battery interface 40. Charger electronics 34 are provided for converting a system voltage into a charging voltage of rechargeable battery 10. Charger cooling device 36 is provided for cooling charger electronics 34. In addition, charger cooling device 36 is provided for conducting an airflow 18 into rechargeable battery 10. Charger cooling device 36 includes a ventilator 38 and an airflow conduction unit 42. Ventilator 38 generates airflow 18, which airflow conduction unit 42 conducts into rechargeable battery 10. Rechargeable battery interface 40 includes an airflow opening 44, through which airflow 18 is conducted out of rechargeable battery charger 32. Alternatively, a rechargeable battery charger could suction an airflow out of a rechargeable battery.

Figure 2:
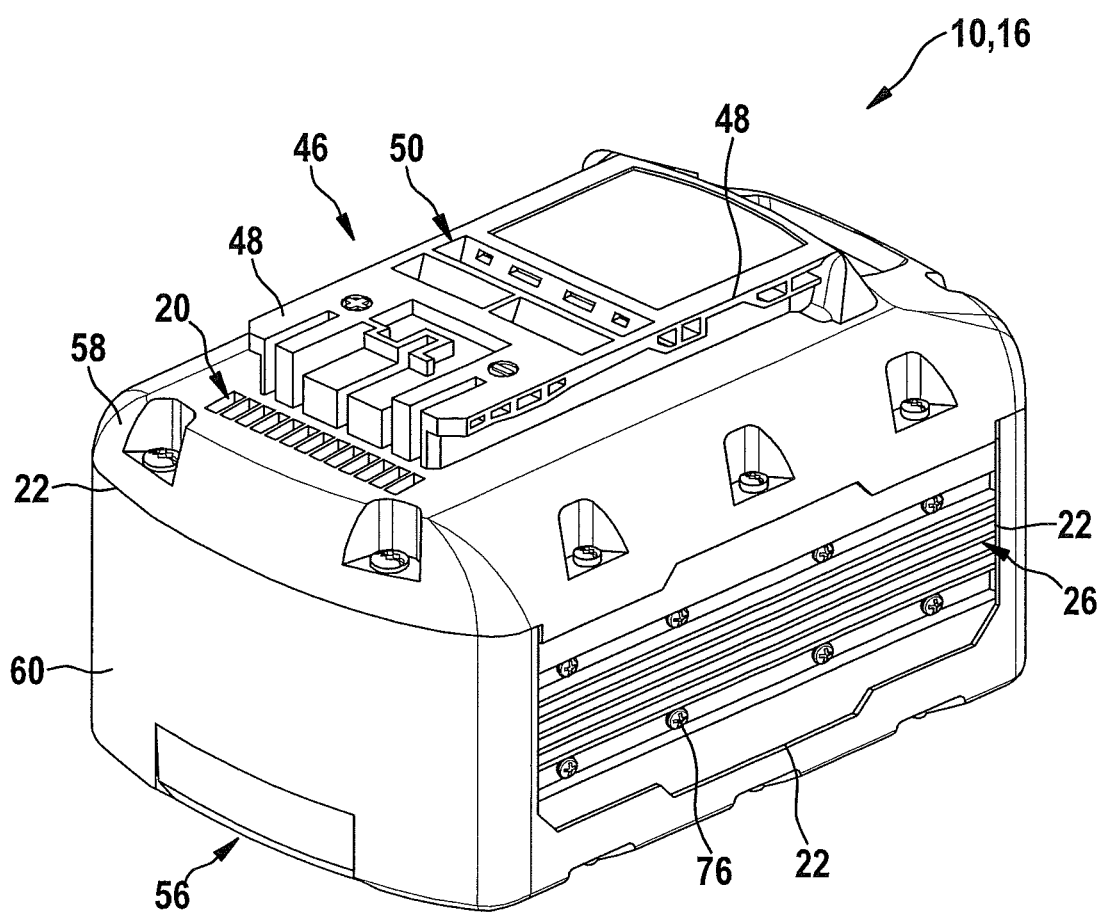
FIG. 2 shows a perspective view of the rechargeable battery from FIG. 1.
Figure 3:
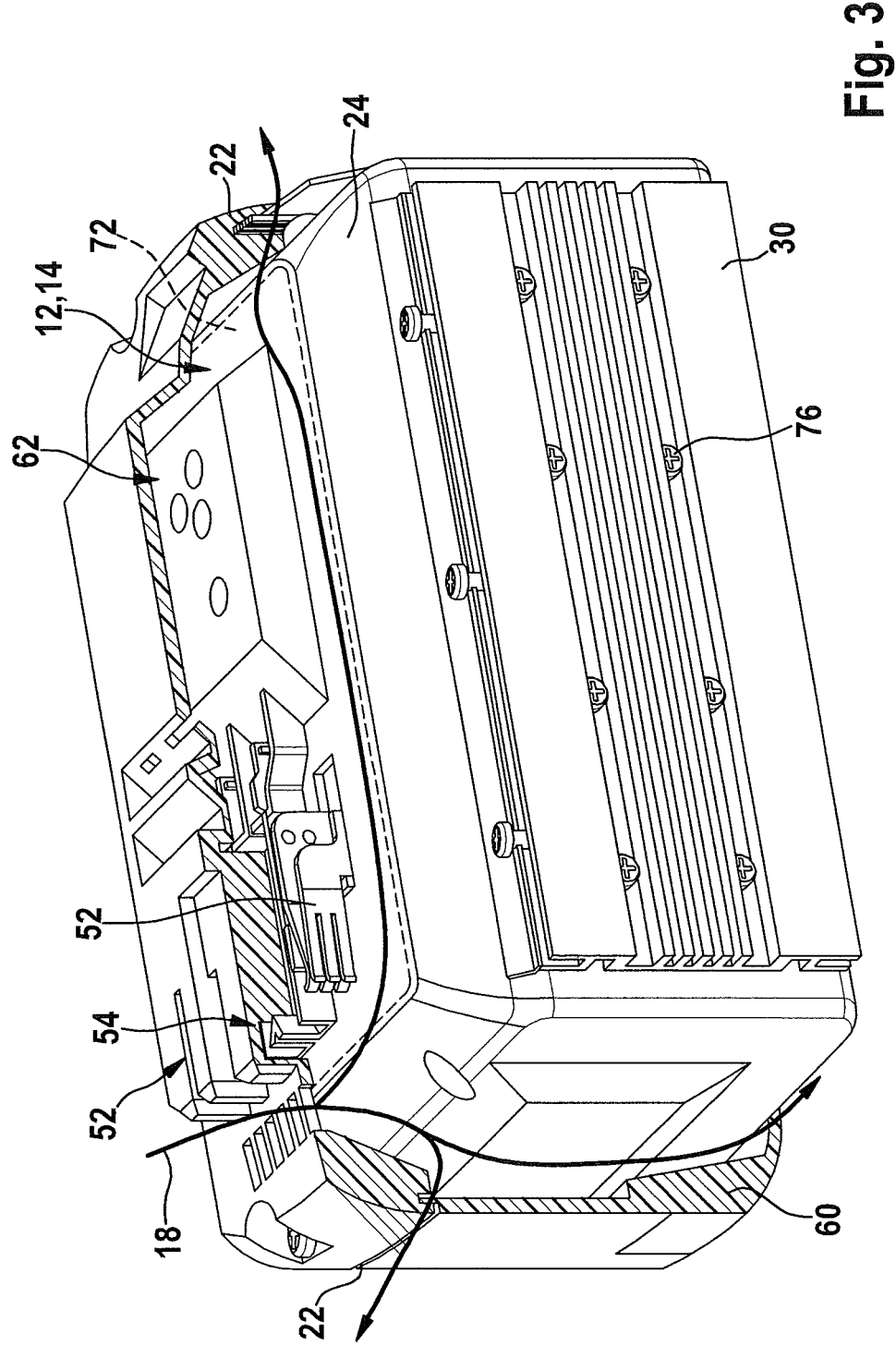
FIG. 3 shows a perspective view of the rechargeable battery from FIG. 1, the external rechargeable battery housing being represented in partial section.
Figure 4:
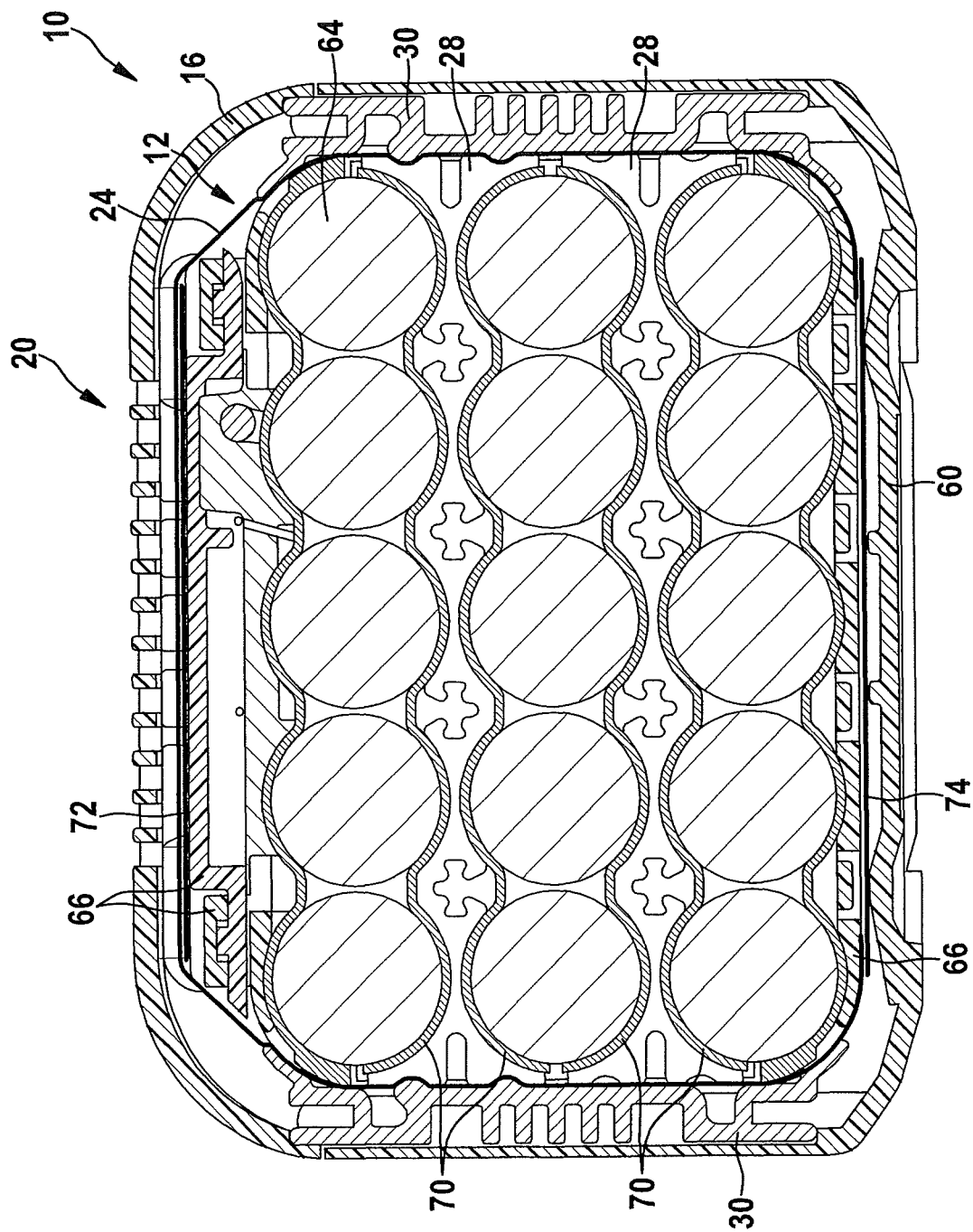
FIG. 4 shows a section of the rechargeable battery from FIG. 1 through an airflow opening of the external rechargeable battery housing.

FIGS. 2 through 4 show rechargeable battery 10. Rechargeable battery 10 is configured as a rechargeable battery for a power tool. Rechargeable battery 10 is provided for supplying a tool, not further shown, with electrical operating energy. Rechargeable battery 10 includes a cell block 12, a sealing device 14, an external rechargeable battery housing 16, a rechargeable battery cooling device 26 and a tool interface 46.

Tool interface 46 is provided for establishing a mechanical and an electrical connection with the tool. To establish the mechanical connection, tool interface 46 includes guide rails 48 and a locking arrangement 50. These elements are formed by external rechargeable battery housing 16. To establish an electrical connection, tool interface 46 includes energy contacts 52 and communication contacts 54. Contacts 52, 54 are situated on cell block 12.

External rechargeable battery housing 16 includes a base body 56 and a cover element 58. Tool interface 46 is situated on cover element 58. Cover element 58 forms one upper side of rechargeable battery 10. Cover element 58 is configured as a plastic part. Cover element 58 delimits an airflow opening 20, through which rechargeable battery charger 32 blows airflow 18 into external rechargeable battery housing 16 during a charging operation. External rechargeable battery housing 16 is provided to conduct airflow 18 externally along cell block 12. Airflow opening 20 has multiple webs, which are provided to prevent a penetration of larger objects.

Airflow 18 exits external rechargeable battery housing 16 through various housing gaps 22 of external rechargeable battery housing 16. In addition, airflow 18 exits through openings of external rechargeable battery housing 16, through which contacts 52, 54 of tool interface 46 are contactable. Housing gaps 22 are situated at least partially between different components of external rechargeable battery housing 16. Housing gaps 22 are situated between base body 56 and cover element 58 of external rechargeable battery housing 16. During a charging operation, housing gaps 22 are not covered by rechargeable battery charger 32. Dust and/or moisture is/are able to penetrate into external rechargeable battery housing 16 through air opening 20 and through other gaps of external rechargeable battery housing 16.

Base body 56 includes a bottom element 60 and two heat radiating arrangement 30. Bottom element 60 delimits rechargeable battery 10 on an underside, a front side and a back side, in each case in relation to a coupling direction of tool interface 46. In addition, bottom element 60 forms four corners adjacent to the underside. Bottom element 60 is configured as a plastic part.

Two heat radiating arrangements 30 delimit rechargeable battery 10 on each side. Heat radiating arrangements 30 are configured as aluminum bodies. Heat radiating arrangements 30 include cooling fins on one exterior. Heat radiating arrangements 30, base body 56 and cover element 58 are screwed together. Together, heat radiating arrangements 30, base body 56 and cover element 58 completely enclose cell block 12. Alternatively or in addition, a rechargeable battery could also include heat radiating arrangement, for example, on the front side, on the back side and/or on the underside.

Cell block 12 includes heat dissipating arrangement 28, multiple rechargeable battery cells 64, a cell block housing 66, electronics not further shown, and fastening arrangement 70. The electronics are provided for monitoring rechargeable battery voltages and temperatures of rechargeable battery cells 64 and to prevent damage to rechargeable battery cells 64. Cell block housing 66 is provided for connecting heat dissipating arrangement 28, rechargeable battery cells 64, the electronics and fastening arrangement 70 to form a module, which forms cell block 12.

Cell block housing 66 delimits an interior space in which the electronics are situated. Contacts 52, 54 of tool interface 46 are partially molded in cell block housing 66. Cell block housing 66 includes air conditioning openings 62, which are closed with a water-proof, breathable diaphragm not further shown.

Sealing device 14 is provided for sealing a space of cell block 12 spanned by cell block housing 66. Sealing device 14 includes a sealing film 24, a first sealant 72 and a second sealant 74. Sealing film 24 has a tubular configuration. Alternatively, the sealing film could have a sack-like configuration. Sealing film 24 is self-shrinking. Sealing film 24 lies flat against the front side, the back side and both lateral sides on cell block 12. Sealing film 24 lies directly flush against heat dissipating arrangement 28 of cell block 12.

First sealant 72 is configured as a sealing compound. In this case, first sealant 72 is configured as a butyl sealant. First sealant 72 is provided for sealing a gap between cell block housing 66 and sealing film 24. Thus, first sealant 72 prevents dust and/or moisture from penetrating into cell block 12.

Second sealant 74 seals an underside of cell block 12 which faces away from tool interface 46. Second sealant 74 is formed as a self-adhesive film. Second sealant 74 closes an opening of tubular sealing film 24 which faces away from tool interface 46. Thus, sealing device 14 encloses cell block 12 on five sides. The sixth side is sealed by cell block housing 66.

Heat dissipating arrangement 28 is provided for dissipating heat from cell block 12 during a charging operation and a discharging operation. Heat dissipating arrangement 28 extends along a straight line through entire cell block 12. Situated on oppositely facing sides of heat dissipating arrangement 28 are rechargeable battery cells 64. Heat dissipating arrangement 28 delimits partially cylindrical recesses, which are provided for at least partially accommodating rechargeable battery cells 64. One each of fastening arrangement 70 is situated between heat dissipating arrangement 28 and rechargeable battery cells 64. Fastening arrangement 70 prevents a direct contact between heat dissipating arrangement 28 and rechargeable battery cells 64. Fastening arrangement 70 is configured as electrically insulating and at least semi-elastic layer elements.

Heat dissipating arrangement 28 and heat radiating arrangement 30 are formed as components configured separately from one another. Heat dissipating arrangement 28 and heat radiating arrangement 30 are connected to one another by screws 76.

Screws 76 press one of heat dissipating arrangement 28 and one of heat radiating arrangements 30 from two different sides against sealing film 24. Thus, screws 76 exert a pressing force against sealing film 24. As a result, heat dissipating arrangement 28 and heat radiating arrangement 30 lie flush against sealing film 24.

Heat created during a charging and a discharging in rechargeable battery cells 64 is conducted by fastening arrangement 70 to heat dissipating arrangement 28. Heat dissipating arrangement 28 conducts this heat out of cell block 12 to sealing film 24. Sealing film 24 conducts a significant portion of the heat to heat radiating arrangement 30. An additional portion of the heat is conducted by screws 76 to heat radiating arrangement 30. Heat radiating arrangement 30 emit the heat by radiation and convection to the surroundings of rechargeable battery 10. Thus, rechargeable battery cooling device 26 is provided for cooling cell block 12 essentially independently of airflow 18.

What is claimed is:

1. A rechargeable battery, comprising:
   a cell block having a sealing device to close the cell block at least in one of a dust-proof manner and a water-proof manner;
   an external rechargeable battery housing, wherein the external rechargeable battery housing is configured to conduct an airflow along between the external rechargeable battery housing and the sealing device; and
   a rechargeable battery cooling device to cool the cell block essentially independently of an airflow, wherein the rechargeable battery cooling device includes:
      at least one heat dissipating arrangement situated in the cell block configured for dissipating heat from the cell block, and
      a heat radiating arrangement configured for at least radiating the heat dissipated by the at least one heat dissipating arrangement,
   wherein, in at least one operating state of the rechargeable battery, the airflow is configured to exit at least through an opening of the external rechargeable battery housing through which a contact of a tool interface is contactable, wherein the tool interface is configured to establish a mechanical and an electrical connection with a power tool, wherein the sealing device has a sealing film which surrounds the cell block on at least one plane and lies against the cell block on at least four sides, wherein the at least one heat dissipating arrangement and the heat radiating arrangement are connected to one another by screws, wherein the screws press the at least one heat dissipating arrangement and the heat radiating arrangement from two different sides against the sealing film causing the at least one heat dissipating arrangement and the heat radiating arrangement to lie flush against the sealing film.

2. The rechargeable battery of claim 1, wherein the external rechargeable battery housing delimits an airflow opening, which is for conducting the airflow into the external rechargeable battery housing.

3. The rechargeable battery of claim 1, wherein the external rechargeable battery housing is for conducting the airflow out through at least one housing gap of the external rechargeable battery housing.

4. The rechargeable battery of claim 1, wherein the sealing device includes a sealing film which encloses the cell block in at least one plane.

5. The rechargeable battery of claim 1, wherein the rechargeable battery is a rechargeable battery for the power tool.

6. The rechargeable battery of claim 1, wherein a housing of the cell block includes openings that are closed with a water-proof, breathable diaphragm.

7. The rechargeable battery of claim 1, wherein the sealing film is self-shrinking.

8. The rechargeable battery of claim 1, wherein the sealing film lies directly flush against the at least one heat dissipating arrangement.

9. A system, comprising:
a rechargeable battery charger; and
a rechargeable battery, including:
  a cell block having a sealing device to close the cell block at least in one of a dust-proof manner and a water-proof manner;
  an external rechargeable battery housing, wherein the external rechargeable battery housing is configured to conduct an airflow along between the external rechargeable battery housing and the sealing device; and
  a rechargeable battery cooling device to cool the cell block essentially independently of the airflow, wherein the rechargeable battery cooling device includes:
    at least one heat dissipating arrangement situated in the cell block configured for dissipating heat from the cell block, and
    a heat radiating arrangement configured for at least radiating the heat dissipated by the at least one heat dissipating arrangement,
  wherein, in at least one operating state of the rechargeable battery, the airflow is configured to exit at least through an opening of the external rechargeable battery housing through which a contact of a tool interface is contactable, wherein the tool interface is configured to establish a mechanical and an electrical connection with a power tool,
  wherein the at least one heat dissipating arrangement and the heat radiating arrangement are connected to one another by screws, wherein the screws press the at least one heat dissipating arrangement and the heat radiating arrangement from two different sides against the sealing device causing the at least one heat dissipating arrangement and the heat radiating arrangement to lie flush against the sealing device.

10. The system of claim 9, wherein the rechargeable battery charger includes charger electronics and a charger cooling device, which is for employing the airflow conducted through the rechargeable battery at least partially for cooling the charger electronics.

11. The system of claim 10, wherein the charger cooling device includes a ventilator to generate the airflow.

12. The system of claim 9, wherein a housing of the cell block includes openings that are closed with a water-proof, breathable diaphragm.

13. A rechargeable battery, comprising:
a cell block having a sealing device to close the cell block at least in one of a dust-proof manner and a water-proof manner;
an external rechargeable battery housing, wherein the external rechargeable battery housing is configured to conduct an airflow along between the external rechargeable battery housing and the sealing device; and
a rechargeable battery cooling device to cool the cell block essentially independently of an airflow, wherein the rechargeable battery cooling device includes:
  at least one heat dissipating arrangement situated in the cell block configured for dissipating heat from the cell block, and
  a heat radiating arrangement configured for at least radiating the heat dissipated by the at least one heat dissipating arrangement,
wherein a tool interface is configured to establish a mechanical and an electrical connection with a power tool,
wherein the sealing device has a sealing film which surrounds the cell block on at least one plane and lies against the cell block on at least four sides,
wherein the at least one heat dissipating arrangement and the heat radiating arrangement are connected to one another by screws, wherein the screws press the at least one heat dissipating arrangement and the heat radiating arrangement from two different sides against the sealing film causing the at least one heat dissipating arrangement and the heat radiating arrangement to lie flush against the sealing film.

* * * * *